United States Patent [19]

Stützle

[11] 4,332,468
[45] Jun. 1, 1982

[54] OPTOELECTRONIC PROXIMITY SENSOR

[75] Inventor: Dietmar Stützle, Lauf, Fed. Rep. of Germany

[73] Assignee: Firma Diehl, Nuremberg, Fed. Rep. of Germany

[21] Appl. No.: 769,893

[22] Filed: Feb. 17, 1977

[30] Foreign Application Priority Data

Feb. 28, 1976 [DE] Fed. Rep. of Germany ....... 2608066

[51] Int. Cl.³ .......................... G01C 3/08; F42C 13/02
[52] U.S. Cl. ....................................... 356/5; 102/213; 343/7 PF; 356/1
[58] Field of Search ................. 356/1, 4, 5; 343/7 PF; 102/70.2 P, 213

[56] References Cited

U.S. PATENT DOCUMENTS

| | | | |
|---|---|---|---|
| 3,661,459 | 5/1972 | Aoki | 356/5 |
| 3,720,468 | 3/1973 | Skagerlund | 356/4 |
| 3,758,209 | 9/1973 | Harvey | 356/4 |
| 4,019,185 | 4/1977 | Morgan | 343/7 PF |

FOREIGN PATENT DOCUMENTS

| | | | |
|---|---|---|---|
| 2161159 | 6/1972 | Fed. Rep. of Germany | 356/5 |
| 2055250 | 1/1976 | Fed. Rep. of Germany | 343/5 PD |

OTHER PUBLICATIONS

M. Mizumachi et al., *Electronics and Communications in Japan*, vol. 57-B, No. 1, 1974.

*Primary Examiner*—S. C. Buczinski
*Attorney, Agent, or Firm*—Spencer & Kaye

[57] ABSTRACT

An optoelectronic proximity sensor having an emitter which directs optical pulses towards a surface as well as a receiver which is oriented toward the point at which the emitted optical pulses impinge on the surface so as to receive a portion of the optical pulses which are scattered back from the surface. The emitter is connected to a pulse generator which causes the emitter to emit the optical pulses at a given pulse repetition frequency. The pulses received by the receiver are evaluated, this being done by a highpass filter which is connected to the receiver and which itself has a limit frequency that is at least approximately equal to the pulse repetition frequency of the pulse generator. A memory circuit is connected to the output of the highpass filter for storing a series of pulses received by the receiver, the arrangement of the parts being such that the memory circuit is rendered capable of receiving the pulses at the beat of the pulse repetition frequency. A control circuit is connected to the output of the memory circuit and puts out an actuation signal when the memory circuit has received a predetermined number of pulses. In practice, the distance sensor is suitable for use with the detonator of a projectile.

5 Claims, 2 Drawing Figures

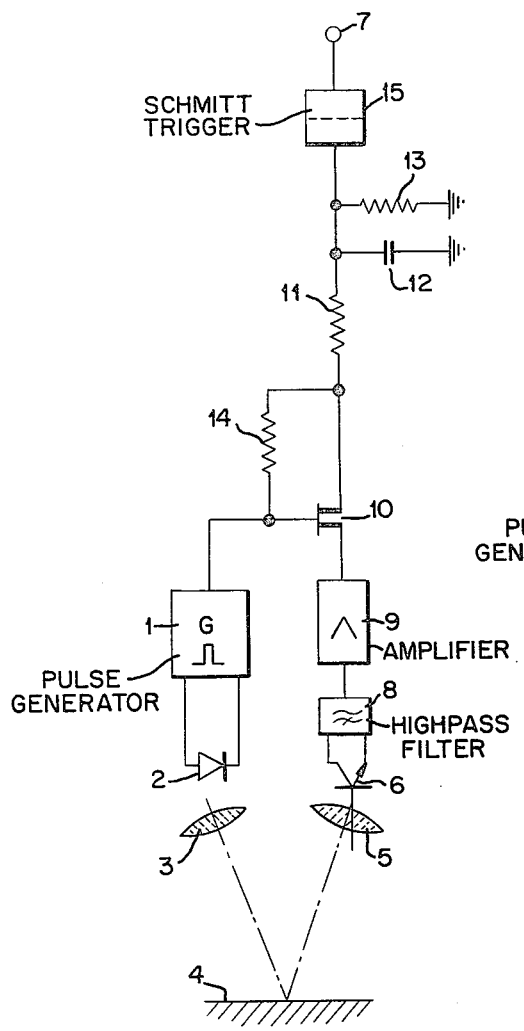
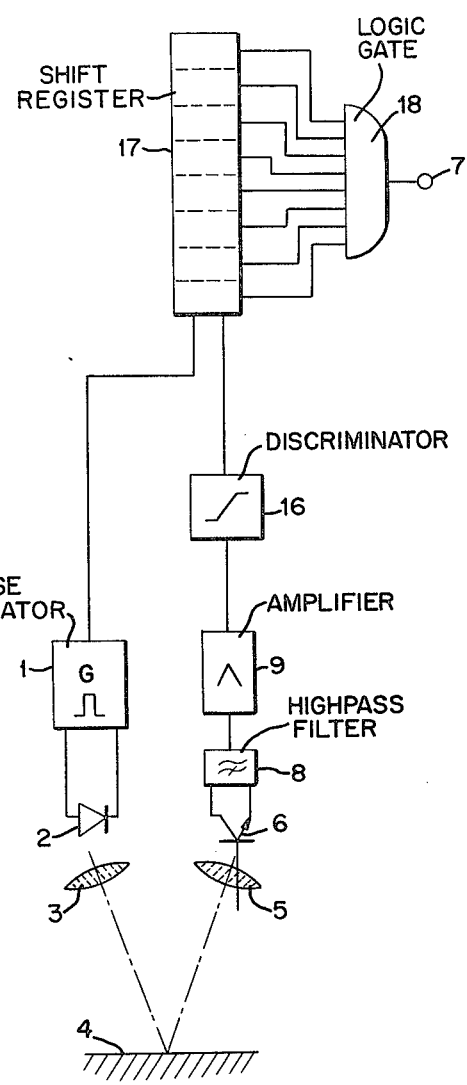

OPTOELECTRONIC PROXIMITY SENSOR

BACKGROUND OF THE INVENTION

The invention relates to an optoelectronic distance sensor, particularly for projectile detonators, which emits directed optical pulses in the beat of a pulse generator and receives portions of these optical pulses which are scattered back from a surface in a receiving member which is oriented toward the point of impingement of the pulses on the surface and evaluates these pulses for putting out an actuation signal.

U.S. Pat. No. 3,013,855 describes a cloud recording device which emits a modulated light beam and processes its reflections in a tuned amplifier and a rectifier. The level of the resulting direct voltage is a measure for the light intensity appearing at the receiver. In order to assure that the device responds only to reflected light emitted by the transmitter, transmitter and receiver operate at a frequency of 120 Hz. No measures for noise suppression are provided.

U.S. Pat. No. 3,613,590 discloses a proximity fuse which emits a transmitting frequency in the direction toward a moving target. The received frequency is then a combination of the transmitted frequency and the Doppler frequencies. After mixing the transmitted frequency and the received frequency and filtering them through a lowpass filter, the resulting signal is utilized for the detonation. In this circuit, there are no noise problems which could not be solved with conventional means.

With an optoelectronic proximity sensor of the abovementioned type, the processing of the noise which is unavoidable due to the optical transmission is of particular significance in order to avoid error signals. An added complicating factor is that in many applications only a very small useful receiving energy can be expected since, on the one hand, the transmitting energy is already being kept as low as possible and, on the other hand, even poorly scattering surfaces must be detected, and that due consideration must be given to the fact that the noise resulting from foreign light sources may often be very strong.

It is the object of the invention to propose an optoelectronic proximity sensor in which the noise portions reaching the receiver are processed in such a manner that they will not lead to error signals, even if there is a low signal-to-noise ratio.

BRIEF DESCRIPTION OF THE INVENTION

The above problem is solved by the invention in that a highpass filter is provided at the receiving end, the highpass filter having a limit frequency which lies at the pulse repetition frequency, that a memory circuit is connected in series with the highpass filter, the memory circuit being designed to store a series of received pulses and being enabled for storage by the pulse generator in the beat of the transmitted pulses and that a control circuit is associated with the memory circuit which, when the memory circuit has received a predetermined number of pulses, puts out the actuating signal.

The highpass filter prevents interfering light components which have low frequencies compared to the light transmitting pulses from reaching the memory circuit. Such long-lasting interfering light pulses would cause the memory to be filled prematurely and consequently lead to misfiring. By freeing the memory circuit in the beat of the pulse repetition frequency, only those components of the scattered light will reach the memory circuit which occur during its free periods. Such light is, in particular, scattered light from the transmitted pulses. Due to the fact that the memory circuit is, in accordance with the present invention, so designed that it causes the control circuit to respond only after a plurality of receiving pulses have been integrated, noise components, although they reach the memory circuit, cannot cause the control circuit to respond.

In one embodiment of the invention, the memory circuit includes a charging capacitor with a series-connected switch which is opened by the pulse generator at its pulse repetition frequency, and a threshold value switch which is connected to the capacitor and which switches at a certain charging state of the capacitor. Since positive and negative noise amplitudes occur with the same probability and both reach the charging capacitor, the result is that, on the average, the positive and negative noise components cancel one another out. Considering a period of several input pulses, the increase in the capacitor charge substantially depends on the stored received pulses. For example, after ten received pulses the charging state has been reached at which the threshold value switch responds and emits the actuation signal.

In another embodiment of the invention, the memory circuit is formed by a digital memory, in particular a shift register, whose clock pulse is controlled by the pulse repetition frequency of the pulse generator and a logic gate evaluates the contents of the individual memory locations. In this case, too, noise components reach the memory in addition to the scattered light pulses from the transmitter. The probability of the occurrence of positive noise amplitudes which would then occupy a memory location is 0.5. With a sufficient number of memory locations, at most half of the memory locations could be occupied by noise amplitudes. The logic gate is designed so that it causes the actuation signal to be put out only if more than half of the memory locations are occupied.

Preferably, an amplitude discriminator is connected ahead of the memory so as to permit only those signals to reach the memory whose amplitude exceeds the amplitude of the smallest useful signal to be expected.

Further embodiments of the invention will become evident from the description that follows.

BRIEF DESCRIPTION OF THE DRAWINGS

FIG. 1 is a the block circuit diagram of one embodiment of the invention.

FIG. 2 is a the block circuit diagram of a further embodiment of the invention.

DETAILED DESCRIPTION OF THE PREFERRED EMBODIMENT

Referring now to the drawings and first to FIG. 1 thereof, the same shows a pulse generator 1 which feeds an emitter in the form of a light emitting diode 2 at a pulse repetition frequency, of, for example, 10 kHz and at a low keying ratio. The light pulses from diode 2 are directed onto a surface 4 by means of a lens 3. If the distance of the proximity sensor from the surface is exactly of such size that light pulses which are reflected by surface 4 reach a receiver in the form of a phototransistor 6 through a lens 5, an actuation signal is put out at an output 7.

Phototransistor 6 has connected behind it a highpass filter 8 whose limit frequency lies somewhat below the pulse repetition frequency of pulse generator 1. In this way, electrical signals originating from constant light or from long light pulses are filtered out.

In FIG. 1, the highpass filter 8 has connected behind it an amplifier 9 whose operating point lies at the potential of one-half the operating voltage so that positive and negative amplitudes emanating from noise light are amplified in the same manner. The output of amplifier 9 is connected to a charging capacitor 12 via a switch 10 and a charging resistor 11. A discharging resistor 13 is connected in parallel with charging capacitor 12.

Switch 10 is constituted by a semiconductor device which can be switched so as to be conductive for positive and negative signals. Switch 10 is switched into the conductive state by pulse generator 1 according to its pulse repetition frequency. In addition, there is a coupling resistor 14.

When switch 10 is conductive, any scattered light pulses which occur as well as positive and negative halfwaves of the noise can reach the charging capacitor 12 via the charging resistor 11. The noise components average each other out so that the capacitor is effectively charged by the scattered light pulses. As soon as the charge in capacitor 12 has reached a certain level, a threshold value switch 15, for example a Schmitt trigger, is activated. This switch then puts out the actuating signal.

In the circuit according to FIG. 2, the highpass filter 8 likewise has connected behind it an amplifier 9. The output signal of the amplifier is connected, via an amplitude discriminator 16, to a shift register with 8 bits. The pulse generator 1 is connected to the clock input of the shift register 17 so that the shift register operates at the beat of the pulse repetition frequency.

The outputs of the individual memory locations of the shift register 17 are connected in parallel with an AND gate 18.

When scattered light pulses, which emanate from the light emitting diode 2 and are reflected from surface 4, impinge, they are amplified by the amplitude discriminator and reach the input of shift register 17 to successively fill its memory locations. If any 8 pulses have arrived, the AND gate 18 switches and the actuation signal is put out at output 7. Signals whose amplitudes are lower than those of the signal emanating from the scattered light are blocked by the amplitude discriminator and do not reach shift register 17.

In case signals originating from noise light occur at high amplitudes and have the same polarity as the scattered light, these signals may also reach the shift register. Since the probability of occurrence of such signals is at most 0.5, they can occupy only a maximum of one-half of the memory locations. In this case, therefore, the AND gate 18 will not be switched.

If it is feared that some of the scattered light pulses to be evaluated are missing, it is possible to connect, instead of AND gate 18, some, for example two, of the outputs of the memory locations with OR gates which themselves are coupled together via AND gates. In this case, the actuating signal 7 appears even if not all memory locations are occupied.

I claim:
1. An optoelectronic proximity sensor comprising:
   (a) means for emitting directed optical pulses towards a surface;
   (b) a pulse generator connected to said emitting means for causing the same to emit the optical pulses at a given pulse repetition frequency;
   (c) means oriented toward the point at which the optical pulses emitted by said emitting means impinge on the surface for receiving a portion of the optical pulses which are scattered back from the surface; and
   (d) means for evaluating the pulses received by said receiving means, said evaluating means comprising
      (1) a highpass filter connected to said receiving means, said highpass filter having a limit frequency which is somewhat below that of the pulse repetition frequency of said pulse generator;
      (2) a memory circuit connected to the output of said highpass filter for storing a series of pulses received by said receiving means;
      (3) means for enabling said memory circuit to store the received pulses at the beat of said pulse repetition frequency of said pulse generator;
      (4) a control circuit connected to the output of said memory circuit for putting out an actuation signal when said memory circuit has received a predetermined number of pulses;
      (5) said memory circuit comprising a digital memory in the form of a shift register having a clock pulse input which is connected to said pulse generator, in consequence of which said shift register is controlled by the pulse repetition frequency of said pulse generator and the sensor senses the proximity from the surface.

2. A proximity sensor as defined in claim 1, wherein said control circuit comprises a logic gate connected to the outputs of said shift register for evaluating the contents of the individual memory locations and putting out said actuating signal when said shift register has stored a given number of pulses.

3. A proximity sensor as defined in claim 2, wherein said logic gate includes an AND circuit.

4. A proximity sensor as defined in claim 2, further comprising an amplitude discriminator connected between the output of said receiving means and the input of said shift register.

5. In combination with a projectile detonator, an optoelectronic proximity sensor as defined in claim 1.

* * * * *